UNITED STATES PATENT OFFICE.

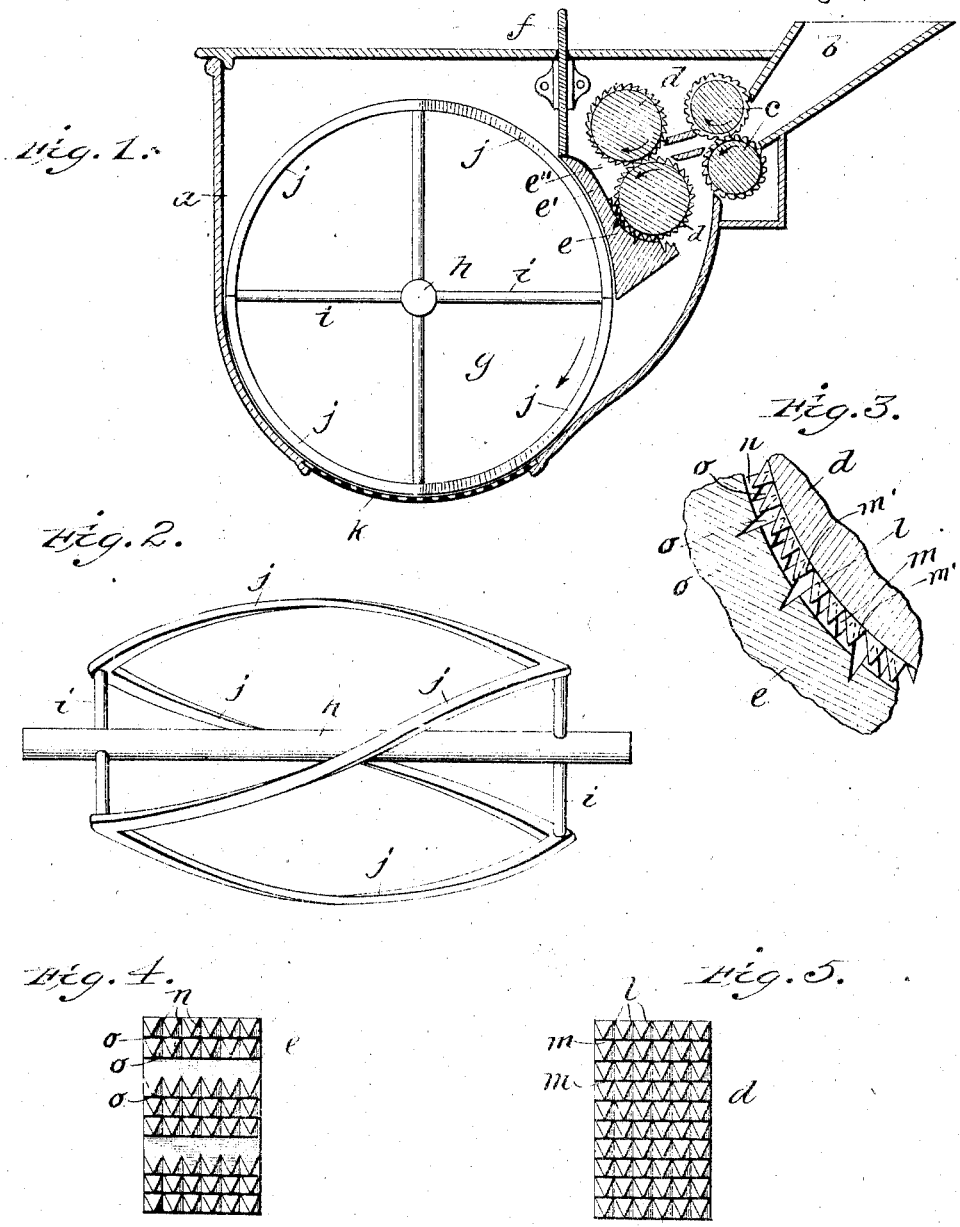

WILLIAM H. LISH, OF YORK, PENNSYLVANIA.

GRINDING, MIXING, AND SIFTING MACHINE.

No. 929,770.  Specification of Letters Patent.  Patented Aug. 3, 1909.

Application filed September 12, 1908. Serial No. 452,720.

*To all whom it may concern:*

Be it known that I, WILLIAM H. LISH, a citizen of the United States of America, and resident of York, in the county of York and State of Pennsylvania, have invented certain new and useful Improvements in Grinding, Mixing, and Sifting Machines, of which the following is a full and clear specification, reference being had to the accompanying drawings, in which—

Figure 1 is a vertical sectional view of an apparatus constructed according to my invention; Fig. 2 is a perspective view in detail of the stirrer; Fig. 3 is a section through a portion of the intersecting tooth surfaces of one of the rolls; Fig. 4 is a detail plan of the tooth face of the concave; and, Fig. 5 is a detail plan of the tooth face of one of the rolls.

The object of this invention is to provide a simple apparatus for grinding all sorts of materials, especially fertilizers, means being provided for very thoroughly and quickly finely comminuting the materials and stirring and sifting the same and for re-grinding the tailings without removing the tailings from the machine, as more fully hereinafter set forth.

Referring to the drawings by reference characters, $a$ designates the casing which may be any suitable shape and size and which is provided with a suitable intake or hopper $b$ leading to the pair of rolls $c$ for preliminarily breaking up and cutting the material, these rolls being used only when the material is of such a nature, as when grinding cornstalks, as to make it desirable or necessary to break up the material before it is presented to the main grinding rolls $d$ located in the casing just beyond the rolls $c$ in such a position as to receive the material as it comes from the rolls $c$.

The rolls are driven in any suitable well known manner, the lower rolls being preferably driven at a faster rate than the upper rolls so as to not only feed the material but to exert a grinding or cutting action. As the material passes between the main rolls $d$ it is partly ground and passes downwardly between the concave $e$ and the lower one of the rolls $d$ and is thus subjected to an additional grinding action. The upper edge $e'$ of the concave is extended upwardly to form a hopper-like space $e''$ which is adapted to receive the material as it comes from between the rolls $d$ and to direct it downwardly between the concave and its roll. A vertically movable gate $f$, working down through an opening in the casing and coming into contact with the upper end $e'$ of the concave separate the hopper $e''$ from the mixing chamber $g$ of the apparatus. The material after it passes the concave falls into the mixing chamber and is thoroughly mixed by a rotary stirrer consisting of a shaft $h$, radial arms $i$, and blades $j$ attached to the outer ends of the arms or spokes $i$ and arranged spirally around an imaginary cylinder.

The bottom of the casing is approximately semi-cylindrical so that the lower half of the stirrer fits close to the inner wall of said semi-cylindrical portion. The inner wall of the concave is also approximately semi-cylindrical to conform substantially to the curvature of the stirrer blades $j$ and approach closely thereto. In the bottom of the casing is a curved screen $k$ adapted to sift out the portions that are sufficiently comminuted to pass through the meshes thereof. This screen may be made removable so that screens of various meshes may be substituted therefor.

It will be observed that the adjacent blades $j$ extend in opposite directions around an imaginary cylinder so that as the stirrer is rotated the succeeding blades will engage the stratum of material adjacent to the concave bottom of the casing and shove it first toward one end of the casing and then toward the other end thereof, this alternate action being carried on rapidly and continuously, thus serving to very thoroughly stir and sift the material in the hopper. When grinding materials too damp to be screened the screen, and the stirrer too if desired, may be removed entirely so that the ground material may fall directly out of the casing without hindrance.

Inasmuch as it would be practically impossible to prevent a small portion of the materials passing between the rolls without being thoroughly ground, it is necessary to re-grind such materials. When enough material collects in the casing the feed may be stopped and the gate $f$ raised, whereupon the unground materials, *i. e.* tailings, will be thrown by centrifugal force by the stirrer into the hopper $e''$ of the concave and thus re-grind the tailings without removing them from the machine.

The faces of the rolls $d$ are provided with parallel circumferential grooves $l$ approximately V-shape in cross-section and also with parallel longitudinal grooves $m$ of substantially the same shape in cross section except that the rear wall $m'$ of the grooves is not inclined but is approximately radial, thus forming pointed teeth approximately saw-tooth shape in cross-section. The rolls are mounted sufficiently close together to permit the teeth of one roll to work freely through the circumferential grooves of the companion roll. With the teeth of the rolls arranged in this manner a very thorough cutting and grinding action is secured, especially in view of the fact that one of the rolls is rotated faster than the other.

The face of the concave $e$ is provided with grooves $n$ running longitudinally of it and the concave is so positioned with reference to the roll that the teeth of the roll work in said grooves $n$, their pointed ends extending nearly to the bottom of the grooves. The concave is also provided with intersecting grooves $o$ approximately V-shaped in cross-section except that the rear wall in each groove is approximately radial. Every third one of these grooves $o$ is carried into the concave deeper than the remaining grooves $o$ and also deeper than the longitudinal grooves $n$, thus forming a series of transverse pocket-like channels. It will be observed that the coacting teeth of the roll and concave, the teeth of each being approximately the same shape in cross-section as the grooves of the other member, will thoroughly and finely grind and cut the materials whatever be their nature. The deeper ones of the grooves $o$ receive the partly ground materials and insure the fine particles being turned or rotated and presented to the succeeding cutting edges of the teeth in a different position, thus preventing the particles passing through without thorough grinding.

The faces of the rolls $c$ may be toothed in any suitable manner but I prefer that they be toothed approximately like the rolls $d$ except that the teeth need not be pointed.

Having thus fully described my invention, what I claim as new, and desire to secure by Letters Patent, is:—

1. In a machine of the type set forth, a casing having a semi-cylindrical bottom provided with a screen, a shaft carrying radial spokes or arms, and a series of stirrer-blades attached to said arms, these blades being spirally arranged and the adjacent blades running in opposite directions and being connected together at their adjacent ends, forming a continuous zigzag spiral extending back and forth the full length of the stirrer, for the purpose set forth.

2. In a grinding machine, a casing, a pair of grinding rolls therein arranged one above the other, a concave grinder coöperating with the under surface of the lower roll and having an upward extension forming a hopper-like throat to receive the materials from the rolls, a vertically-movable gate back of the upper roll and adapted to engage the upper end of the extension of the concave, a screen in the bottom of the casing, and a rotary stirrer therein, all for the purpose set forth.

In testimony whereof I hereunto affix my signature in the presence of two witnesses this 11th day of September 1908.

WILLIAM H. LISH.

Witnesses:
  CHAS. M. GARLINGER,
  S. D. WAREHEIM.